United States Patent [19]

Oshidari

[11] Patent Number: 5,063,815
[45] Date of Patent: Nov. 12, 1991

[54] LINE PRESSURE CONTROL FOR V-BELT TYPE CONTINUOUSLY VARIABLE TRANSMISSION

[75] Inventor: Toshikazu Oshidari, Yokohama, Japan

[73] Assignee: Nissan Motor Co., Ltd., Yokohama, Japan

[21] Appl. No.: 336,422

[22] Filed: Apr. 11, 1989

[30] Foreign Application Priority Data

Apr. 11, 1988 [JP] Japan .................................. 63-47739

[51] Int. Cl.$^5$ ............................................ B60K 41/12
[52] U.S. Cl. ...................................................... 74/867
[58] Field of Search ..................... 192/3.3; 74/866, 867

[56] References Cited

U.S. PATENT DOCUMENTS

| | | | |
|---|---|---|---|
| 4,478,105 | 10/1984 | Yamamuro et al. | 192/3.3 |
| 4,682,518 | 7/1987 | Takada et al. | 74/867 |
| 4,735,113 | 4/1988 | Yamamuro et al. | 74/867 X |
| 4,827,804 | 5/1989 | Tezuka et al. | 74/867 X |
| 4,843,918 | 7/1989 | Morimoto | 74/866 |
| 4,898,050 | 2/1990 | Sakai | 74/867 |
| 4,904,229 | 2/1990 | Hattori | 74/867 |
| 4,909,103 | 3/1990 | Morimoto | 74/867 X |
| 4,955,260 | 9/1990 | Oshidari | 74/866 X |

FOREIGN PATENT DOCUMENTS

| | | |
|---|---|---|
| 53-137375 | 11/1978 | Japan . |
| 56-97661 | 8/1981 | Japan . |
| 57-191134 | 11/1982 | Japan . |
| 58-146756 | 9/1983 | Japan . |
| 61-105353 | 5/1986 | Japan . |
| 62-153466 | 9/1987 | Japan . |
| 63-31833 | 2/1988 | Japan . |
| 63-176862 | 7/1988 | Japan . |

Primary Examiner—Leslie A. Braun
Assistant Examiner—Matthew Stavish
Attorney, Agent, or Firm—Foley & Lardner

[57] ABSTRACT

A V-belt continously variable transmission includes a torque converter shiftable between a lock-up state and a non lock-up state. A pulley unit includes a driver pulley, a follower pulley, and a V-belt drivingly interconnecting the driver and follower pulleys. At least one of the driver and follower pulleys is hydraulically actuated in response to a line pressure to induce a force which the V-belt is gripped with by the pulley. The line pressure control system is constructed and arranged such that the magnitude of the line pressure is increased when the torque converter is in the non lock-up state.

5 Claims, 8 Drawing Sheets

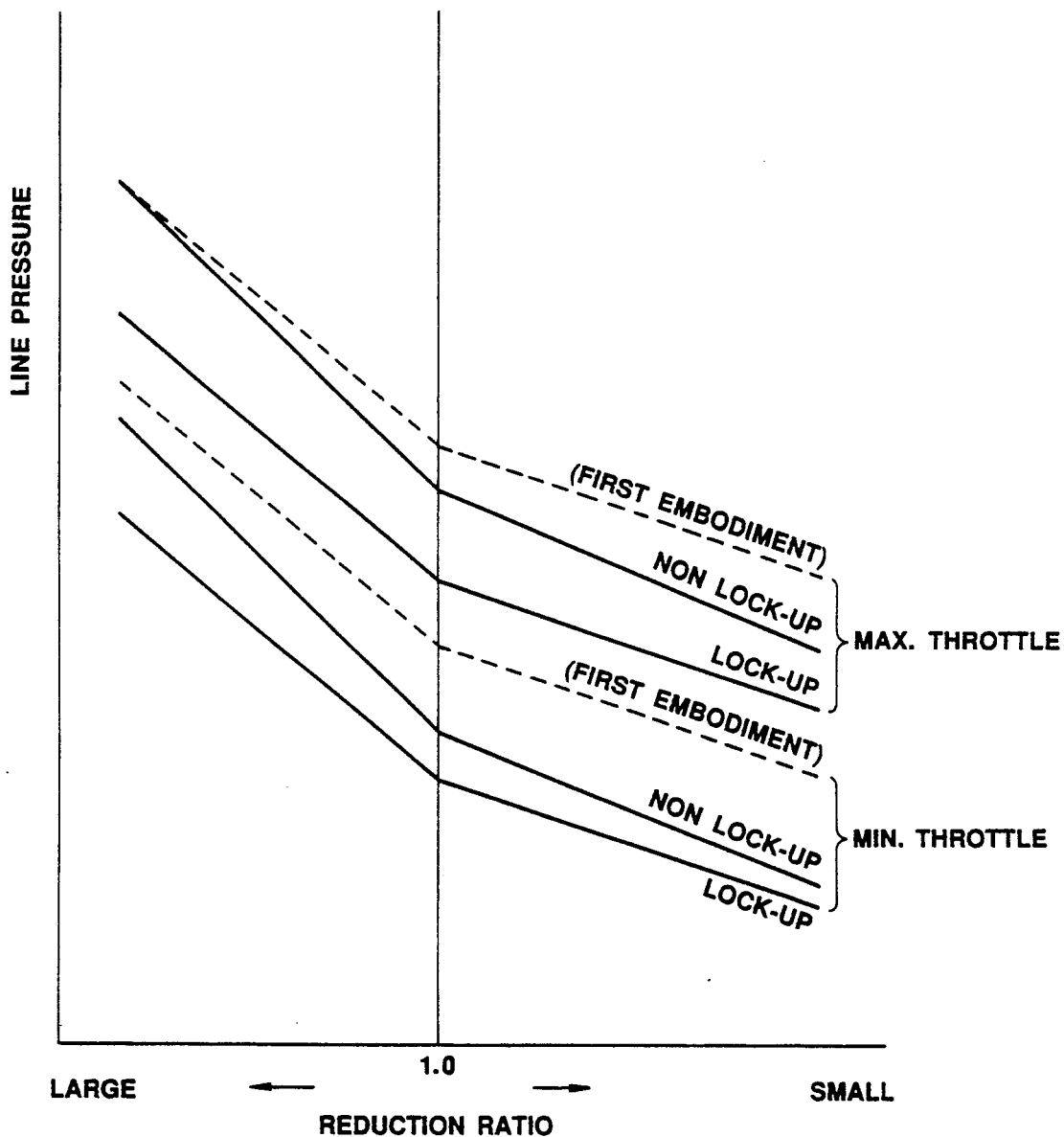

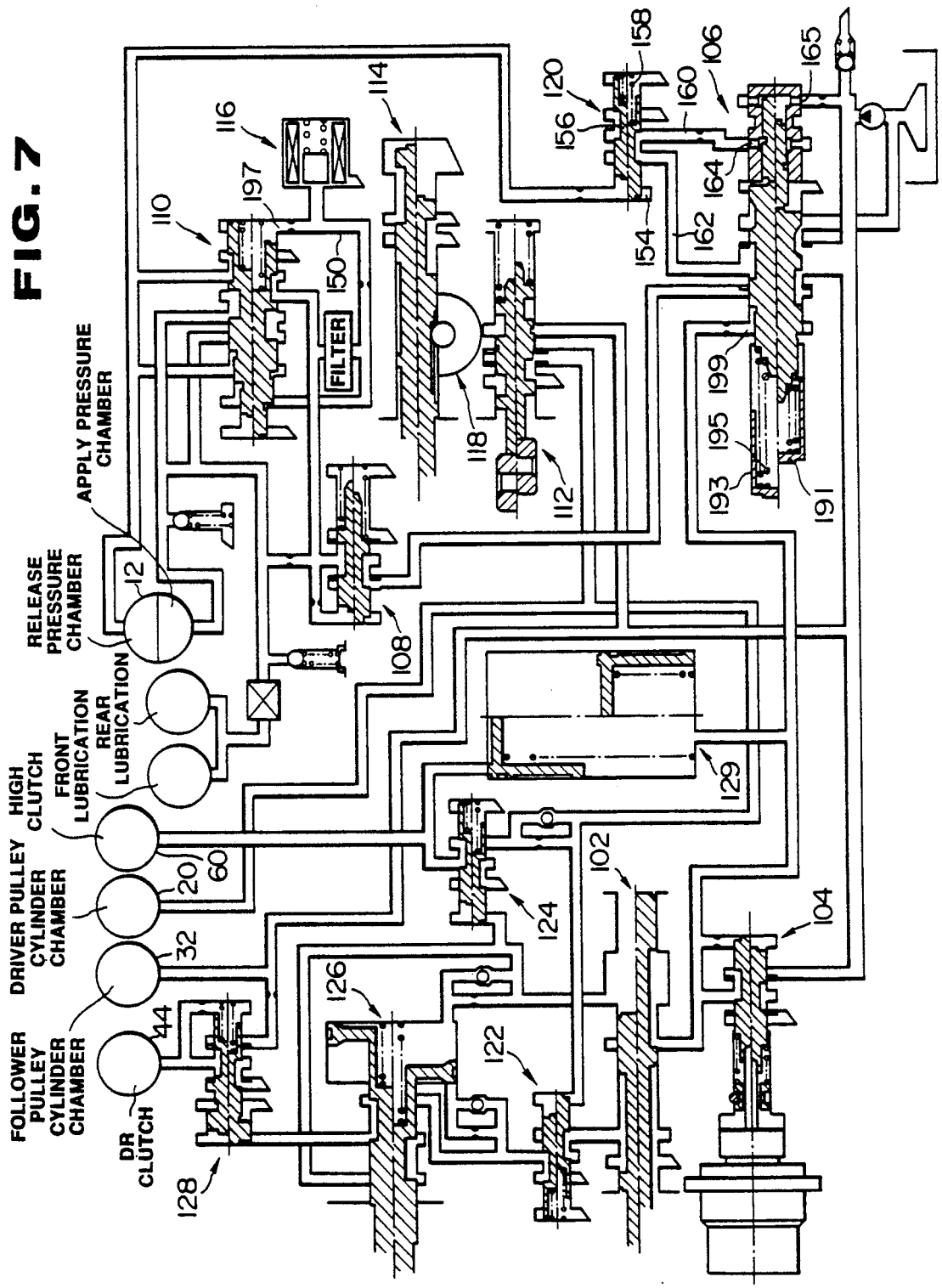

LINE PRESSURE CONTROL FOR V-BELT TYPE CONTINUOUSLY VARIABLE TRANSMISSION

BACKGROUND OF THE INVENTION

The present invention relates to a line pressure control for a V-belt type continuously variable transmission.

There is known a V-belt type continuously variable transmission including a fluid coupling with a lock-up clutch for improving start-up performance of the vehicle which the transmission is mounted to. A transmission of the above kind is disclosed in Japanese Utility Model First Publication No. 62-153466.

The start-up performance is, however, not satisfactory since no torque multiplication is made by the fluid coupling. If the fluid coupling is replaced with a torque converter, it is necessary to increase the line pressure in accordance with an increase of torque due to the torque multiplication by the torque converter. Otherwise, there occurs a slip between a V-belt and the associated pulleys at least one of which is subject to the line pressure to grip the V-belt. If in order to solve this problem the line pressure is increased to a level high enough to cause the pulley to grip the V-belt firmly when the torque converter effects the torque multiplication, an excessively large gripping force is applied to the V-belt when the torque converter ceases its torque multiplication function. This causes a degradation of endurability of the V-belt. If the line pressure is maintained high, the energy loss of an oil pump increases accordingly.

An object of the present invention is to solve the above-mentioned problems.

A specific object of the present invention is to provide a line pressure control system for a V-belt type continuously variable transmission wherein the line pressure is increased whenever a torque multiplication is expected.

SUMMARY OF THE INVENTION

According to the present invention, there is provided a line pressure control system for a V-belt type continuously variable transmission including a torque converter shiftable between a lock-up state and a non lock-up state, a driver pulley, a follower pulley, and a V-belt drivingly interconnecting the driver and follower pulleys, at least one of the driver and follower pulleys being hydraulically actuated in response to a predetermined hydraulic fluid pressure to induce a force which the V-belt is gripped with by the pulley, the line pressure control system, comprising:

means for generating a signal indicative of whether the torque converter is in the lock-up state or the non lock-up state;

means for generating the predetermined hydraulic fluid pressure, said generating means including means responsive to said signal for increasing the magnitude of the predetermined hydraulic fluid pressure when said signal indicates that the torque converter is in the non lock-up state.

BRIEF DESCRIPTION OF THE DRAWINGS

FIG. 6 are line pressure variation characteristics provided by the second and third embodiments; and FIG. 7 is a similar view to FIG. 5 but with a third embodiment of a line pressure control according to the present invention.

DETAILED DESCRIPTION OF THE EMBODIMENTS

First Embodiment

Figure 2:
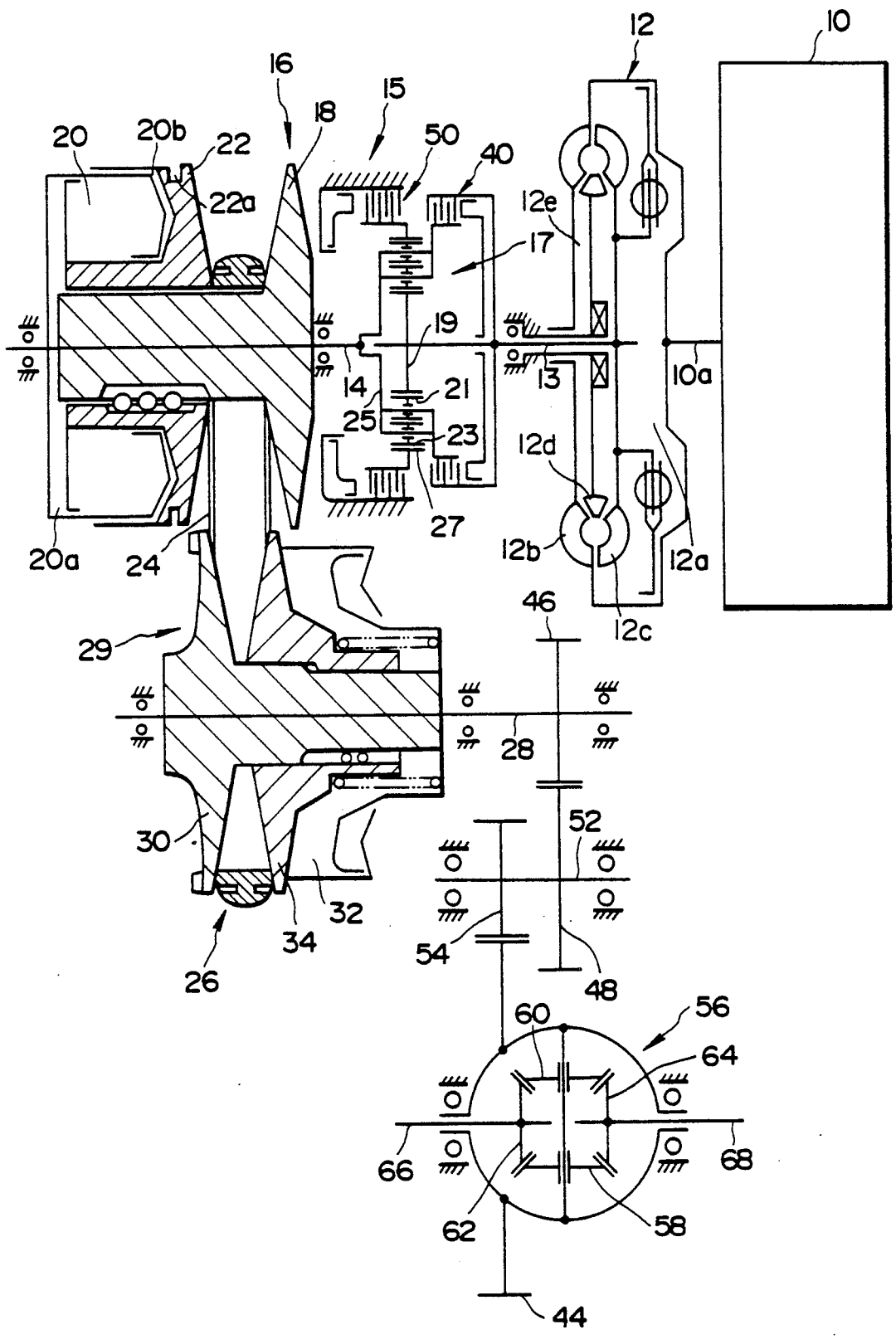
FIG. 2 is a schematic diagram of a power train of the V-belt type continuously variable transmission as being coupled with an engine of a passenger car.

FIG. 2 shows a power train of a continuously variable transmission (CVT). This CVT comprises a torque converter 12, a forward reverse selector mechanism 15, a V-belt type continuously variable pulley unit 29, and a differential 56. With the CVT, the rotation of an output shaft 10a of an engine 10 is transmitted to output shafts 66 and 68 to rotate same at a reduction ratio desired and in a rotational direction desired. This CVT is described in Japanese Patent First Publication No. 61-105353 or European Patent application published under publication number 0180209 on May 7, 1986 or U.S. patent application Ser. No. 922,400, now U.S. Pat. No. 4,735,113 issued to Yamamuro et al. on Apr. 5, 1988. Briefly, it comprises a torque converter 12 (which includes a release pressure chamber 12a, a pump impeller 12d, a turbine runner 12c, a stator 12d, and an apply pressure chamber 12e), a rotary shaft 13, a driver shaft 14, the above-mentioned forward reverse selector mechanism 15, a driver pulley 17 (which includes an axially fixed conical pulley member 18, a driver pulley cylinder chamber 20 with chambers 20a and 20b, an axially movable conical pulley member 22, and a pulley groove 22a), a planetary gearing 17 (which includes a sun gear 19, a pinion gear 21, a pinion gear 23, a pinion carrier 25, and an internal gear or ring gear 27), a V-belt 24, a follower pulley 26 (which includes an axially fixed conical pulley member 30, a follower pulley cylinder chamber 32, and an axially movable conical pulley member 34), a follower shaft 28, a forward clutch 40, a driver gear 46, an idler gear 48, a reverse brake 50, an idler shaft 52, a pinion gear 54, a final gear 44, a pinion gear 58, a pinion gear 60, a side gear 62, a side gear 64, the output shaft 66, and the output shaft 68.

Figure 1A:
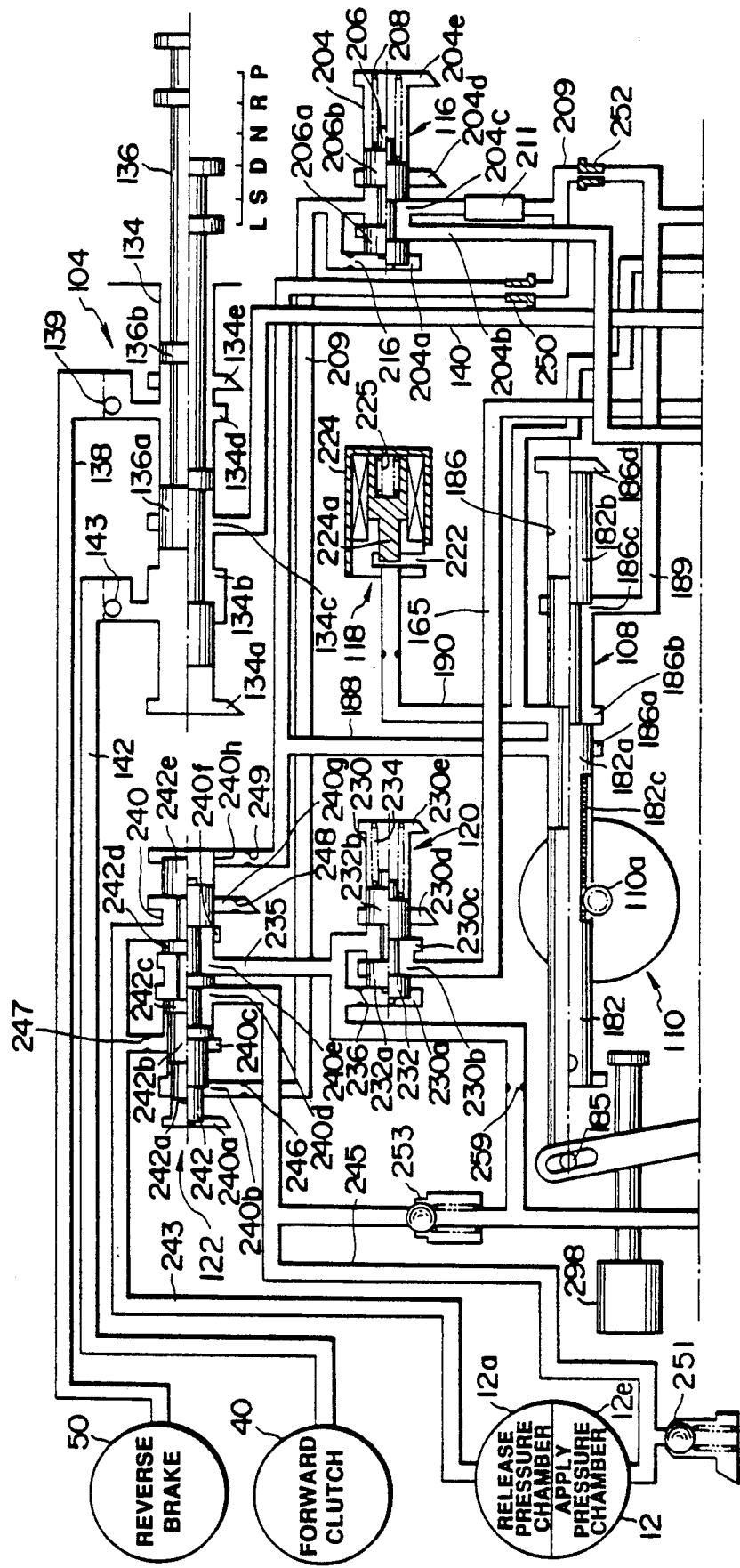
FIGS. 1A and 1B, when combined, are a hydraulic fluid circuit of a hydraulic control system for a V-belt type continuously variable transmission, the hydraulic control system incorporating a first embodiment of a line pressure control according to the present invention.
Figure 1B:
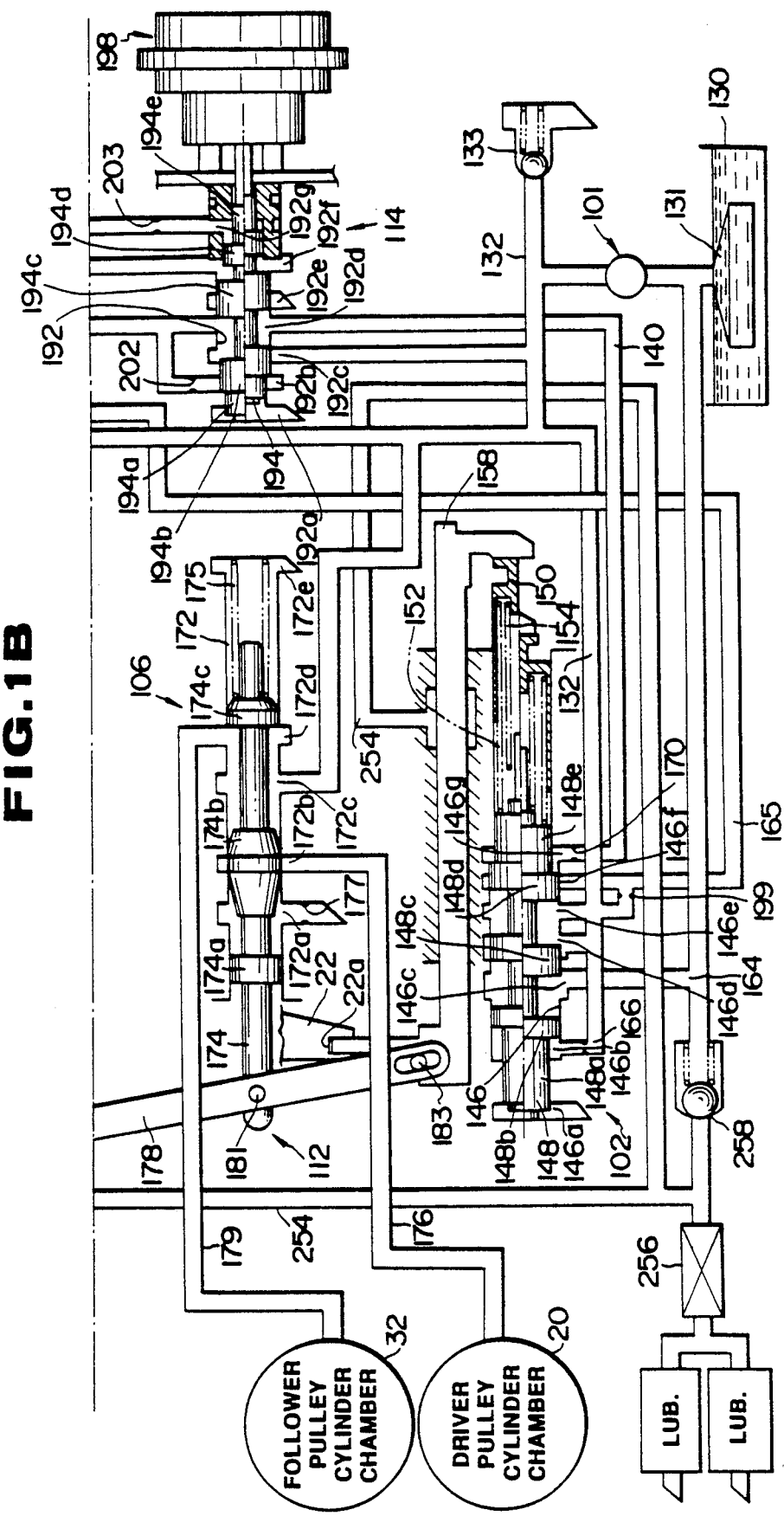

Referring to FIGS. 1A and 1B, a hydraulic control system comprises an oil pump 101, a line pressure regulator valve 102, a manual valve 104, a shift control valve 106, an adjustment pressure selector valve 108, a shift motor (stepper motor) 110, a shift operating mechanism 112, a throttle valve 114, a constant pressure regulator valve 116, a solenoid valve 118, a torque converter pressure regulator valve 120, a lock-up control valve 122. They are interconnected as illustrated and connected also with the forward clutch 40, the reverse brake 50, the release pressure chamber 12a and the apply pressure chamber 12e of the torque converter, the driver pulley cylinder chamber 20, and the follower pulley cylinder chamber 32. The detailed description of these hydraulic elements is hereby omitted. Those portions which have not been mentioned are described in the previously mentioned patent documents. However, the hydraulic control system shown in FIG. 1 is different from its counterpart described in the above-mentioned patent documents in that a hydraulic fluid conduit 190 that has a drain port controlled in an ON/OFF manner by the solenoid valve 118 is connected to a pressure boost port 192f of a throttle valve 114. The manner of controlling the solenoid 118 is described in the previously listed U.S. Pat. No. 4,735,113 (Yamamuro et al.). In FIG. 1, also shown are a pinion gear 110a, a tank 130, a strainer 131, a hydraulic fluid conduit 132, a relief valve 133, a valve bore 134, ports 134a to 134e, a spool 136, lands 136a, 136b, a hydraulic fluid conduit 138, a one-way orifice 139, a hydraulic fluid conduit 140, a hydraulic fluid conduit 142, a one-way orifice 143, a valve bore 146, ports 146a to 146g, a spool 148, lands 148a to 148e, a sleeve 150, a spring 152, a spring 154, a bias member 158, a hydraulic fluid conduit 164, a hydraulic fluid conduit 165, an orifice 166, an orifice 170, a valve bore 172, ports 172a to 172e, a spool 174, lands 174a to 174c, a spring 175, a hydraulic fluid conduit 176, an orifice 177, a lever 178, a hydraulic fluid conduit 179, a pin 181, a rod 182, lands 182a and 182b, a rack 182c, a pin 183, a pin 185, a valve bore 186, ports 186a to 186d, a hydraulic fluid conduit 188, a hydraulic fluid conduit 189, a hydraulic fluid conduit 190, a valve bore 192, ports 194a to 194e, a vacuum diaphragm 198, an orifice 199, an orifice 202, an orifice 203, a valve bore 204, ports 204a to 204e, a spool 206, lands 206a to 206e, a spring 208, a hydraulic fluid conduit 209, a filter 211, an orifice 216, a drain port 222, a solenoid 224, a plunger 224a, a spring 225, a valve bore 230, ports 230a to 230e, a hydraulic fluid conduit 243, a hydraulic fluid conduit 245, an orifice 246, an orifice 247, an orifice 248, an orifice 249, a choke type throttle valve 250, a relief valve 251, a choke type throttle valve 252, a pressure maintaining valve 253, an orifice 259, a change-over detection switch 278.

The operation of this first embodiment is described. When there is a command for establishing a non lock-up state of the torque converter, the duty factor of electric signal supplied to the solenoid valve 118 is 0% to cause the solenoid valve 118 to close the drain port 222, thus holding the hydraulic fluid pressure within the hydraulic fluid conduit 190 in a high level state. The hydraulic fluid pressure with this high level state is supplied via the adjustment pressure selector valve 108 and the hydraulic fluid conduit 188 to the port 240h of the lock-up control valve 122, urging the spool of the lock-up control valve 122 to assume a position as illustrated by the lower half thereof as viewed in FIGS. 1A and 1B. This induces a state where the hydraulic fluid pressure is supplied to the torque converter 12 at the release pressure chamber 12a side and discharged therefrom at the apply pressure chamber 12e side. This causes the lock-up clutch to stay in its disengaged or released state. This hydraulic fluid pressure within the hydraulic fluid conduit 190 is supplied also to a pressure boost port 192f of the throttle valve 114, pushing up the level of the throttle pressure. The increased throttle pressure is supplied to a pressure boost port 146g of the line pressure regulator valve 102, thus causing an increase in the line pressure.

When, on the other hand, there is a command for establishing a lock-up state of the torque converter, the duty factor becomes 100% to cause the solenoid valve 118 to open the drain port 222, thus allowing the hydraulic fluid pressure within the hydraulic fluid conduit 190 to drop down to a low level state (for example, a hydraulic pressure being zero). This low level hydraulic fluid pressure is supplied via the adjustment pressure selector valve 108 and the hydraulic fluid conduit 188 to a port 240h of the lock-up control valve 122, causing the spool of the lock-up control valve 122 to take a position as illustrated by the upper half thereof. This causes the release pressure chamber 12a side of the torque converter 12 to be drained, thus engaging the lock-up clutch. Since the low hydraulic fluid pressure within the hydraulic fluid conduit 190 is supplied also to a pressure boost port 192f of the throttle valve 114, rendering the throttle pressure within the hydraulic fluid conduit 140 to stay at the low level state. This low throttle pressure within the hydraulic fluid conduit 140 is supplied to the pressure boost port 146g of the line pressure regulator valve 102, maintaining the line pressure at the low level state.

Accordingly, since the hydraulic fluid pressure in the conduit 190 serves as a signal indicative of whether the torque converter is in the non lock-up state or the lock-up state, the level of the line pressure is high during the non lock-up state of the torque converter, while the level of the line pressure is low during the lock-up state of the torque converter. As a result, the level of the line pressure is increased only when the torque converter performs the torque multiplication function.

Second Embodiment

Figure 3:
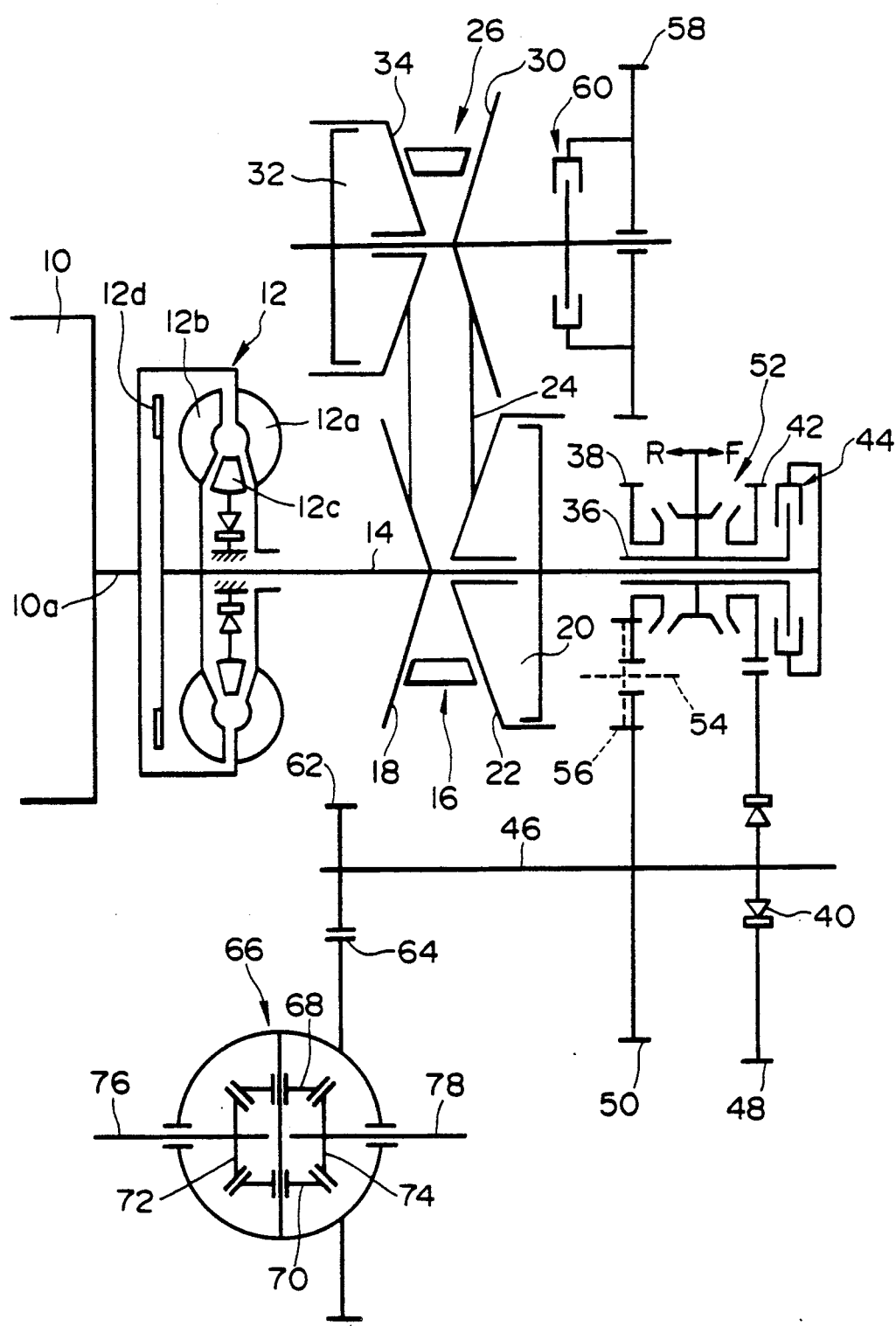
FIG. 3 is a schematic diagram of a power train of a transmission resulting from combination of a V-belt type continuously variable power train with a gear power train.
Figure 4:
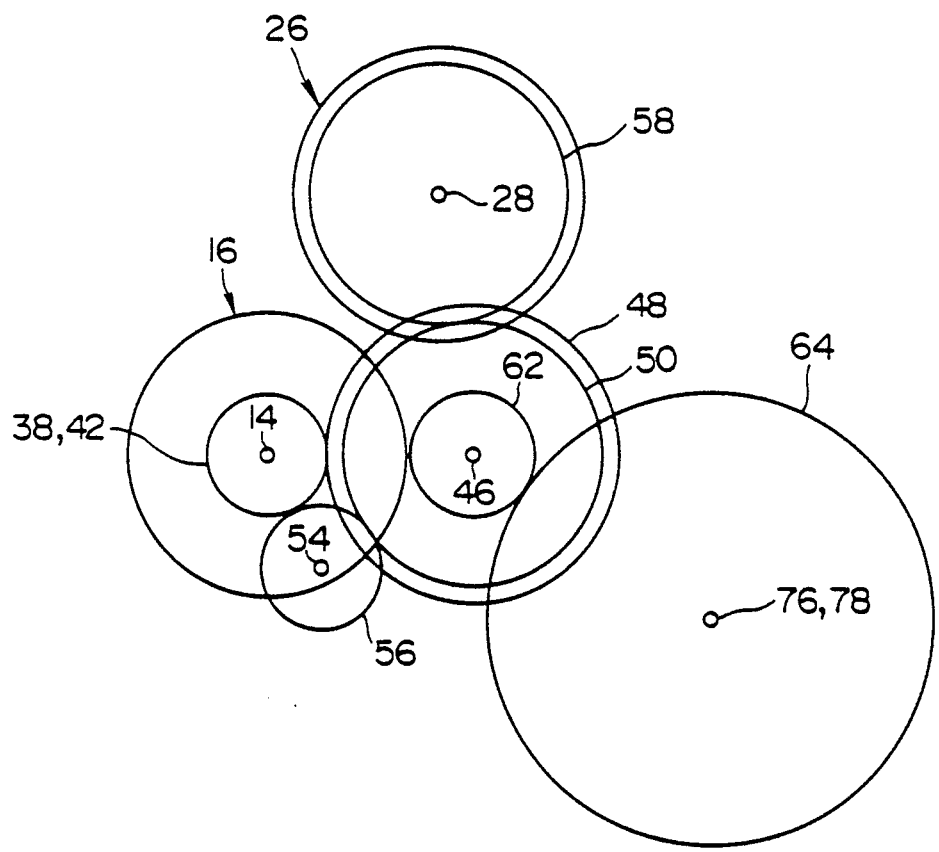
FIG. 4 is a schematic diagram showing an arrangement of various shafts and rotary members of the transmission shown in FIG. 3.

Referring to FIGS. 3 and 4, a vehicular transmission according to the present invention is described.

Referring now to FIG. 3, an engine 10 is shown as having an output shaft 10a which a torque converter 12 is coupled with in the conventional manner. The torque converter 12 includes, as usual, a pump impeller 12a, a turbine runner 12b, and a stator 12c. It also includes a lock-up clutch 12d which the pump impeller 12a and turbine runner 12b are selectively interconnected with. The turbine runner 12b of the torque converter 12 is drivingly connected to a driver shaft 14. On the driver shaft 14 is a driver pulley 16. The driver pulley 16 includes an axially fixed conical pulley member 18 fixedly connected to the driver shaft 14, and an axially movable conical pulley member 22 slidably mounted to the driver shaft 14 in opposed spaced relationship with the fixed conical pulley member 18. The conical pulley members 18 and 22 define therebetween a V-shaped pulley groove therebetween. The driver pulley 16 includes a driver pulley cylinder chamber 20. The movable conical pulley member 22 is axially movable toward the fixed conical pulley member 18 in response to hydraulic pressure developed in the driver pulley cylinder chamber 20, causing the V-shaped pulley groove to decrease its width. The driver pulley 16 is drivingly connected via a V-belt 24 to a follower pulley 26. The follower pulley 26 includes an axially fixed conical pulley member 30 fixedly connected to a follower shaft 28, and an axially movable conical pulley member 34 slidably mounted to the follower shaft 28 for axial movement. The conical pulley members 30 and 34 define therebetween a V-shaped pulley grove therebetween. The follower pulley 26 includes a follower pulley cylinder chamber 32. The movable conical pulley member 34 is axially movable toward the stationary conical member 30 in response to hydraulic pressure developed in the follower pulley cylinder chamber 32. The driver pulley 16, the V-belt 24, and the follower pulley 26 form a V-belt type continuously variable pulley unit. The setting is such that the maximum reduction ratio provided by this V-belt type continuously variable transmission power train only is smaller than the reduction ratio provided by gear power train including a forward gear 42 on the driver shaft side and a forward gear 48 on the output shaft side, which are described later. The driver shaft 14 extends through a hollow shaft 36. The hollow shaft 36 is rotatably supported on the driver shaft 14. Rotatably supported on the hollow shaft 36 are a reverse gear 38 on the driver shaft side and a forward gear 42 on the driver shaft side. The forward gear 42 and the reverse gear 38 are selectively connected to the hollow shaft 36 by means of a mechanical selector in the form of a synchronous dog clutch 52 having a forward position (F position), a reverse position (R position), and a neutral position. Alternatively, a dog clutch without neutral may be used. With a drive reverse clutch 44, the driver shaft 14 is selectively connected to the hollow shaft 36. Extending in parallel to the driver shaft 14 is an output shaft 46. The output shaft 46 has the above-mentioned forward gear 14 mounted thereto via a one-way clutch 40 and a reverse gear 50 for unitary rotation therewith. The forward gear 48 is in constant mesh with the forward gear 42. The reverse gear 50 is in constant mesh with a reverse idler gear 50 that is rotatable with an idler shaft 54. The reverse idler gear 56 is in constant mesh with the reverse gear 38, too. In FIG. 3, since it is impossible to illustrate them in the cross sectional plane, the reverse idler shaft 54 and reverse idler gear 56 are illustrated by the broken line. Actually, they are arranged as illustrated in FIG. 4. In FIG. 3, the shaft distance and the gear diameter do not reflect the actual relationship. Thus, in order to know the actual relationship, reference should be made to FIG. 4. The follower shaft 28 has a forward gear 58. Via a high clutch 60, the forward gear 58 is connected to the follower shaft 28. As best seen in FIG. 4, the forward gear 58 is in constant mesh with the reverse gear 50. The forward gear 58 and the reverse gear 50 have the same diameter. The output shaft 46 has a reduction gear 62 for rotation therewith. The reduction gear 62 is in constant mesh with a final gear 64 of a differential 66. The differential 66 includes a pair of pinion gears 68 and 70 which are rotatable with the final gear 64. A pair of side gear 72 and 74 mesh with the pinion gears 68 and 70. The side gears 72 and 74 are coupled with drive shafts 76 and 78, respectively, for rotation therewith.

The neutral state is provided when the drive reverse clutch 44 and the high clutch 60 are both released. In this state, the transmission of torque from the driver shaft 14 to the output shaft 46 is interrupted.

On start-up or hill-climbing where a relatively large driving force is required, the forward clutch 52 is engaged and the low clutch 44 engaged. The high clutch 60 is released. In this state, the torque of the output shaft 10a of the engine 10 is transmitted via the torque converter 12 to the driver shaft 14, and further to the hollow shaft 36 via the drive reverse clutch 44 that is engaged. The torque of the hollow shaft 36 is transmitted via the dog clutch 52 to the forward gear 42, and further to the forward gear 48 which the gear 42 meshes with. Owing to the fact that the forward gear 48 is drivingly connected via the one-way clutch 40 to the output shaft 46, the torque is transmitted to the output shaft 46. Thereafter, the torque is transmitted via the reduction gear 62 and the final gear 64 to the differential 66 where it is distributed between the drive shafts 76 and 78, causing wheels of the vehicle, not illustrated, to rotate. During the power transmission mentioned above, the torque is not transmitted through the V-belt type continuously variable pulley unit, but through the gearing mechanism. At the reduction ratio provided by the intgermeshed forward gears 42 and 48, the torque is increased, thus providing a relatively large driving force.

When the operating condition develops and demands a less driving force, the high clutch 60 is engaged with the above described state maintained. This causes the torque transmission through the V-belt type continuously variable pulley unit. The torque of the driver shaft 14 is transmitted via the V-belt 24 and the follower pulley 26 to the follower shaft 28, and further to the forward gear 58 via the high clutch 60 that is engaged. Since the forward clutch 58 meshes with the reverse gear 50, the torque is transmitted to the output shaft 46, and further to the driver shafts 76 and 78 via the same power path as previously described. In this case, the output shaft 46 rotates at a higher speed than the forward gear 48 does, and thus the one-way clutch 40 idles. This allows the drive reverse clutch 44 to be kept engaged. In the manner as described above, the torque is transmitted via the V-belt type continuously variable pulley unit. Thus, the reduction ratio can be varied continuously by varying the width of the V-groove of the driver pulley 26 which in turn induces variation in the width of the follower pulley 26.

In establishing the reverse state, the dog clutch 52 is shifted to the R position, causing the reverse gear 38 to rotate with the hollow shaft 36 as a unit, and the drive reverse clutch 44 is engaged with the high clutch 60 released. In this state, the torque of the drive shaft 14 is transmitted via the drive reverse clutch 44, the hollow shaft 36, the dog clutch 52, the reverse clutch 53, the reverse gear 38, the reverse idler gear 56, and the reverse gear 50 to the output shaft 46. Since the reverse idler gear 56 is disposed in the power transmission path, the rotational direction of the output shaft 46 is the opposite to the rotational direction of the output shaft 46 in the cases previously described. Thus, the vehicle can travel in the reverse direction.

Figure 5:
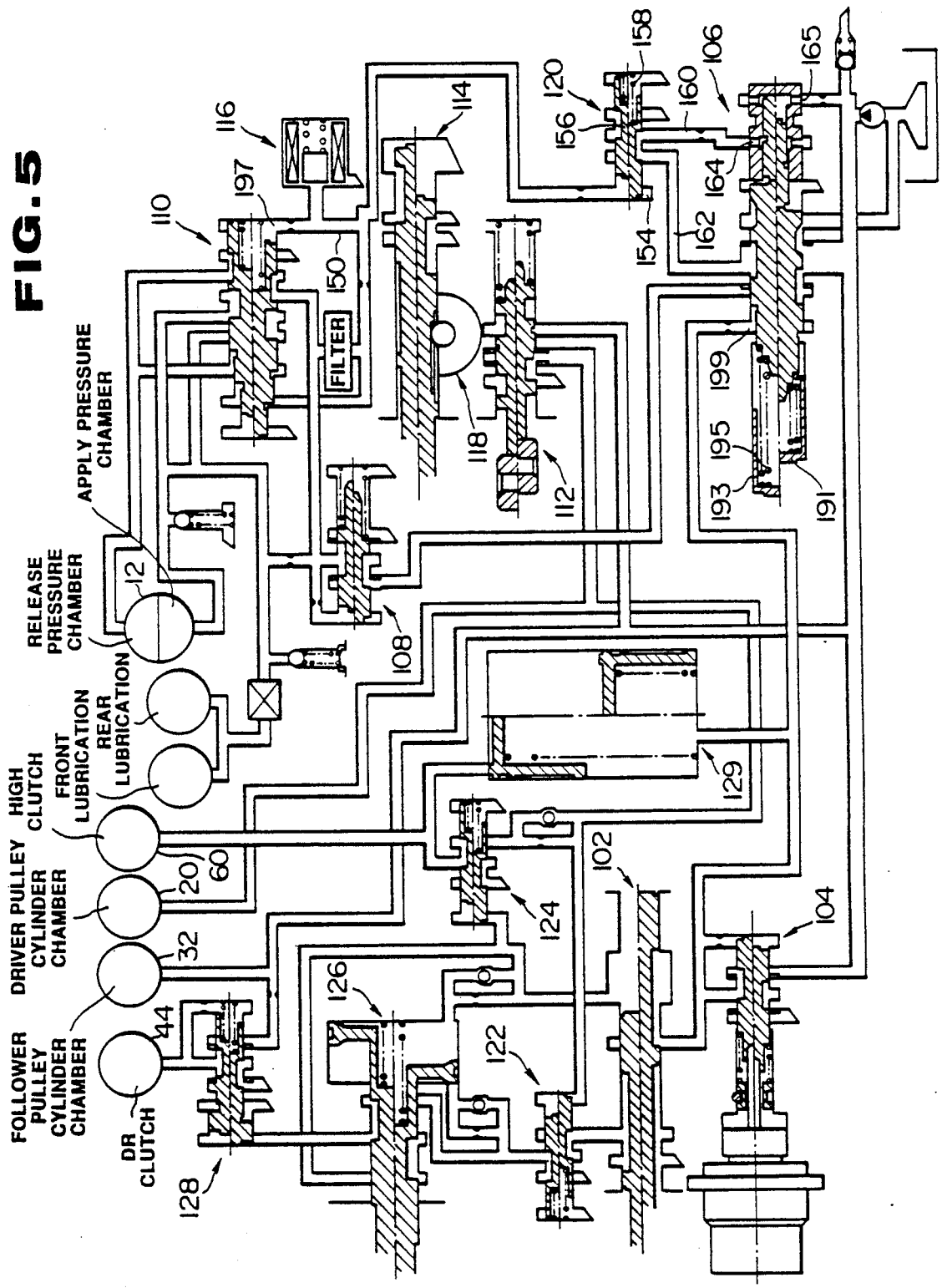
FIG. 5 is a hydraulic circuit of a hydraulic control system for the transmission shown in FIG. 3, incorporating a second embodiment of a line pressure control according to the present invention.

Referring to FIG. 5, a hydraulic control system for this transmission is now described. The control system performs, as a main role, a shift control. The system generally comprises a manual valve 102, a throttle valve 104, a line pressure regulator valve 106, a torque converter pressure reduction valve 108, a lock-up control valve 110, a shift control valve 112, a shift command valve 114, a solenoid valve 116, a stepper motor 118, a line pressure servo valve or feedback selector 120, a reverse inhibitor valve 122, a neutral valve 124, a shift valve 126, a drive reverse clutch pressure amplifier valve 128, and a high clutch accumulator 129. The drive reverse clutch 44, high clutch 60, driver pulley cylinder chamber 20, follower pulley cylinder chamber 32, and an apply pressure chamber and a release pressure chamber of the torque converter 12 are connected to the above-mentioned hydraulic elements. The manual valve 102, a directional control valve serving as a drive range position selector, is operatively connected with a select lever to be manually operated by a driver. The throttle valve 104 effects pressure regulation in response to engine intake manifold vacuum and generates a throttle pressure which is in inverse proportion to the magnitude of the manifold vacuum. The line pressure regulator valve 106 is a valve to adjust the pressure of hydraulic fluid discharged by the oil pump, no numeral. The torque converter pressure reduction valve 108 is a pressure regulator valve to keep the pressure supplied to the torque converter 12 in a predetermined state. The lock-up control valve 110 is a valve to control engagement/release of a lock-up clutch. The shift control valve 112 is a valve to control shifting of reduction ratio in the V-belt type continuously variable pulley unit. The shift command valve 114 is actuated by the stepper motor 118 and issues a command for a reduction ratio which the V-belt type continuously variable pulley unit should shift. The solenoid valve 116 has a task to control the lock-up control valve 110 and another task to control the line pressure. The stepper motor 118 actuates the shift command valve 114 in response to an output signal of a control unit. The line pressure servo valve 120 is a valve to control the line pressure in a manner described later. The reverse inhibitor valve 122 is a valve to prevent interlock which otherwise would be caused when the high clutch 60 and the reverse clutch 44 are engaged simultaneously. The neutral valve 124 is a valve to securely provide the neutral state. The shift valve 126 is a valve to shift the dog clutch 52. The high clutch accumulator 129 is an accumulator to alleviate shock upon engagement by the high clutch 60. The driver reverse clutch amplifier valve 128 is a valve to control hydraulic fluid pressure supplied to the drive reverse clutch 44.

Hereinafter, the line pressure regulator valve 106, the lock-up control valve 110, the solenoid valve 116, and the feedback selector valve 120 are further described.

The solenoid valve 116 adjusts the hydraulic fluid pressure in a hydraulic fluid conduit 150 in response to duty signal generated by the control unit.

The hydraulic fluid conduit 150 is connected to a port 154 of the feedback selector valve 120. The feedback selector valve 120 includes a spool 156 which is shiftable when a predetermined relation is established between the hydraulic fluid pressure at the port 154 and the force of a spring 158. When the hydraulic fluid pressure at the port 154 is greater than a predetermined value, a hydraulic fluid conduit 160 is drained, while when the hydraulic fluid pressure at the port 154 is not greater than the predetermined value, the hydraulic fluid pressure 160 is connected to a hydraulic fluid pressure 162. The hydraulic fluid conduit 162 is a line pressure conduit that is always supplied with the line pressure. The hydraulic fluid conduit 160 is connected to a feedback port 164 which when pressurized acts on the spool of the line pressure regulator valve 106 in such a manner as to induce a reduction in the line pressure generated by the line pressure regulator valve 106. The line pressure regulator valve 106 is provided also with another feedback port 165 that is always supplied with the line pressure. This line pressure regulator valve 106 effects pressure regulation in such a manner as to balance a force acting on the spool from a sleeve 191 via springs 193 and 195 and a force due to the throttle pressure acting on a port 199 with forces due to the line pressure acting on the feedback port 165 and the line pressure acting on the feedback port 164. The sleeve 191 is subject to a force, applied thereto via a linkage, which is proportional to the reduction ratio. The lock-up control valve 110 is controlled in response to the hydraulic fluid pressure acting on a port 197. When the hydraulic fluid pressure at the port 197 is in the high level state, the spool of the lock-up control valve 110 takes the position as illustrated by the lower half thereof as viewed in FIG. 5. When the hydraulic fluid pressure at the port 197 is in the low level state, the spool of the lock-up control valve 110 takes the position as illustrated by the upper half thereof as viewed in FIG. 5. When the lock-up control valve 110 takes the position as illustrated by the lower half thereof, the hydraulic fluid pressure from the torque converter pressure reduction valve 108 is supplied to the release pressure chamber of the torque converter 12, causing the lock-up clutch 12d to take the non lock-up state. On the contrary, when the lock-up control valve 110 takes the position as illustrated by the upper half thereof, the hydraulic fluid pressure is supplied to the apply pressure chamber of the torque converter 12, causing the lock-up clutch to take the lock-up state.

The operation of the second embodiment is described. When there is a command for establishing the non lock-up state of the torque converter, the hydraulic fluid with the hydraulic fluid conduit 150 which is adjusted by the solenoid valve 116 assumes the high level state and the lock-up control valve 110 takes the position as illustrated by the lower half thereof as viewed in FIG. 5. This causes the hydraulic fluid pressure to be supplied to the torque converter 12 at the release pressure chamber side and to be discharged from the torque converter 12 at the apply pressure chamber side, disengaging or releasing the lock-up clutch 12d. Since, as described, the hydraulic fluid pressure within the hydraulic fluid conduit 150 is in the high level state, the feedback selector valve 120 takes the position as illustrated by the upper half thereof, draining the hydraulic fluid from the hydraulic fluid conduit 160. Since the hydraulic fluid conduit 160 is connected to the feedback port 164 and thus the hydraulic fluid is drained from this port 164 as described above, the line pressure regulator valve 106 effects pressure regulation in such a manner that the force due to the line pressure applied to the feedback port 165 balances with the opposed force. Therefore, the line pressure is kept increased to the high level state.

When there is a command for establishing the lock-up state of the torque converter, the hydraulic fluid pressure within the hydraulic fluid conduit 150 which is adjusted by the solenoid valve 116 drops. This causes the lock-up control valve 110 to take the position as illustrated by the upper half thereof as viewed in FIG. 5, allowing the supply of the hydraulic fluid to the apply pressure chamber side and draining the hydraulic fluid from the release pressure chamber. As a result, the lock-up clutch 12d is engaged. Besides, since the hydraulic fluid pressure within the hydraulic fluid conduit 150 drops, the feedback selector valve 120 takes the position as illustrated by the lower half thereof, permitting the hydraulic fluid conduit 160 to communicate with the hydraulic fluid conduit 162, allowing the line pressure to be applied to the feedback port 164. Therefore, the magnitude of the line pressure is decreased as compared to the case where the line pressure is not applied to the feedback port 164.

As previously described, the line pressure increases when the torque converter is in the non lock-up state as compared to the case when the torque converter is in the lock-up state. This line pressure increase is caused by changing a pressure acting area provided for feedback function. As shown by the fully drawn lines in FIG. 6, the line pressure increase or difference upon a shift from the lock-up state to the non lock-up state varies as the reduction ratio varies. If the line pressure increase at the maximum throttle (i.e., the fully opened position of the throttle valve) with the largest reduction ratio is set such that the line pressure after this pressure increase becomes high enough to agree with the level required by the pulley unit with the non lock-up state of the torque converter, the line pressure increase is suppressed or decreased as the reduction ratio becomes smaller and smaller and the throttle opening degree becomes smaller and smaller. Thus, an unnecessary pressure increase during operation at small throttle opening degrees with small reduction ratios is avoided. The variation characteristic of the line pressure generated according to the first embodiment is illustrated by two broken lines in FIG. 6. The broken lines shown in FIG. 6 exibit the line pressure variation characteristic during the lock-up state of the torque converter and that during the non lock-up state of the torque converter. In the case of the first embodiment, the line pressure increase is induced by increasing the throttle pressure by a predetermined constant.

Third Embodiment

The third embodiment is described in connection with FIG. 7. This embodiment is substantially the same as the second embodiment except the fact that a port 154 of a feedback selector valve 120 is connected to a release pressure chamber of a torque converter 12 to receive the release hydraulic fluid pressure building up in the release pressure chamber. As will be readily understood, since the supply of hydraulic fluid pressure to the port 154 ceases during non lock-up state of the torque converter 12, the spool of the feedback selector valve 120 assumes the position as illustrated by the upper half thereof as viewed in FIG. 7. Thus, under this condition, the supply of the line pressure to a feedback port 164 of a line pressure regulator valve 106 ceases either.

Although the second and third embodiments have been described in association with a transmission resulting from combining a gear power train with a V-belt type continuously variable power train, the features according to the second and third embodiments may be embodied in a transmission similar to the first embodiment of the transmission.

What is claimed is:

1. In a V-belt type continuously variable transmission:
   a torque converter shiftable between a lock-up state and a non lock-up state;
   a driver pulley drivingly connected to said torque converter;
   a follower pulley;
   a V-belt drivingly interconnecting said driver and follower pulleys, at least one of said driver and follower pulleys being hydraulically actuated in response to a predetermined hydraulic fluid pressure to induce a force which the V-belt is gripped with by the pulley;
   means for generating a signal indicative of whether the torque converter is in the lock-up state or the non lock-up state; and
   means for generating said predetermined hydraulic fluid pressure, said predetermined hydraulic pressure generating means including means responsive to said signal for increasing said predetermined hydraulic fluid pressure from a first level to a second level that is higher than said first level when said signal indicates that said torque converter is in the non lock-up state, said increasing means being inoperative when said signal indicates that said torque converter is in the lock-up state to leave said predetermined hydraulic pressure at said first level.

2. A V-belt type continuously variable transmission as claimed in claim 1, wherein said predetermined hydraulic pressure generating means includes a line pressure regulator valve formed with a pressure boost port, and said increasing means includes a throttle valve supplying a throttle pressure to said pressure boost port of said line pressure regulator valve, said throttle valve including means responsive to said signal for setting said throttle pressure at a relatively high level when said signal indicates that the torque converter is in the non lock-up state, while setting said throttle pressure at a relatively low level that is lower than said relatively high level, said line pressure regulator valve including means for the magnitude of said predetermined hydraulic fluid pressure in response to the magnitude of said throttle fluid pressure supplied to said pressure boost port.

3. A V-belt type continuously variable transmission as claimed in claim 1, wherein said predetermined hydraulic pressure generating means includes a line pressure regulator valve having a feedback circuit and a feedback port, and said increasing means includes a selector valve having a first position wherein said feedback port is drained and a second position wherein said feedback port is connected to said feedback circuit, said selector valve including means responsive to said signal for urging said selector valve to take said first position thereof thereby to drain said feedback port when said signal indicates that said torque converter is in the non lock-up state, said line pressure regulator valve including means having a pressure acting area always exposed to said feedback port for setting said predetermined hydraulic fluid pressure at a relatively high level from a relatively low level that is lower than said relatively high level when said feedback port is drained.

4. A V-belt type continuously variable transmission as claimed in claim 3, wherein said signal generating means includes means for generating a constant hydraulic fluid pressure, conduit means for receiving said constant hydraulic fluid pressure, said conduit means having a drain port, solenoid valve means for closing said drain port, said solenoid means being operative to close said drain port when said torque converter is in the non lock-up state and open said drain port when said torque converter is in the lock-up state, said conduit means communicating with said selector valve to deliver as said signal said constant hydraulic fluid pressure to said selector valve.

5. A V-belt type continuously variable transmission as claimed in claim 3, wherein said signal generating means includes means for defining a release pressure chamber for urging said torque converter to the non lock-up state, and means for delivering a hydraulic fluid from said release pressure chamber to said selector valve as said signal.

* * * * *